(12) United States Patent
Mallonee et al.

(10) Patent No.: US 8,216,459 B2
(45) Date of Patent: *Jul. 10, 2012

(54) APPARATUS FOR REMOVING HYDROCARBONS AND CONTAMINATES

(75) Inventors: Doug Mallonee, Mobile, AL (US); Edward Beverly Moe, Montgomery, TX (US)

(73) Assignee: Green Intellectual Properties, LLC, Mobile, AL (US)

(*) Notice: Subject to any disclaimer, the term of this patent is extended or adjusted under 35 U.S.C. 154(b) by 0 days.

This patent is subject to a terminal disclaimer.

(21) Appl. No.: 12/884,887

(22) Filed: Sep. 17, 2010

(65) Prior Publication Data

US 2011/0068063 A1    Mar. 24, 2011

Related U.S. Application Data

(60) Provisional application No. 61/243,865, filed on Sep. 18, 2009, provisional application No. 61/243,831, filed on Sep. 18, 2009.

(51) Int. Cl.
*C02F 9/02* (2006.01)
*C02F 9/10* (2006.01)

(52) U.S. Cl. ........ 210/182; 210/201; 210/202; 210/241; 210/260; 210/512.1

(58) Field of Classification Search ............... 175/66; 209/172; 210/182, 201, 260
See application file for complete search history.

(56) References Cited

U.S. PATENT DOCUMENTS

| | | | |
|---|---|---|---|
| 2,102,341 A | 4/1936 | Von Fuchs | |
| 5,055,180 A * | 10/1991 | Klaila | 208/402 |
| 5,192,423 A | 3/1993 | Duczmal et al. | |
| 5,344,255 A | 9/1994 | Toor | |
| 5,570,749 A | 11/1996 | Reed | |
| 5,957,301 A * | 9/1999 | Wedel et al. | 209/173 |
| 6,113,800 A | 9/2000 | Hopkins et al. | |
| 7,514,011 B2 * | 4/2009 | Kulbeth | 210/780 |
| 7,713,417 B2 * | 5/2010 | Sutton | 210/624 |
| 8,017,021 B1 * | 9/2011 | Staples | 210/773 |
| 2005/0109715 A1 | 5/2005 | Stoy et al. | |
| 2006/0016689 A1 * | 1/2006 | Carson et al. | 205/43 |
| 2009/0156877 A1 | 6/2009 | Newman et al. | |

* cited by examiner

*Primary Examiner* — Tony G Shoohoo
*Assistant Examiner* — Peter Keyworth
(74) *Attorney, Agent, or Firm* — Buskop Law Group, PC; Wendy Buskop

(57) ABSTRACT

One or more apparatuses for removing hydrocarbons and contaminates are provided. The apparatus for removing hydrocarbons and contaminates can include a hopper in communication with a material moving device. The material moving device can be at least partially disposed within a trough. An injection port can be disposed in the trough. A separation tank can be communication with the material moving device, and the separation tank can be in fluid communication with a scalper, a shaker screen, a screen, a hydrocyclone, a dewatering centrifuge, a clarifying tank, or combinations thereof.

4 Claims, 16 Drawing Sheets

APPARATUS FOR REMOVING HYDROCARBONS AND CONTAMINATES

CROSS REFERENCE TO RELATED APPLICATIONS

The present application claims priority to U.S. Provisional Patent Application Ser. No. 61/243,865 filed on Sep. 18, 2009, entitled "Single Tank Apparatus For Removing Hydrocarbons and Contaminates", which is incorporated herein in its entirety; and to U.S. Provisional Patent Application Ser. No. 61/243,831 filed on Sep. 18, 2009, entitled "Method for Removing Hydrocarbons From a Particulate", which is incorporated herein in its entirety.

FIELD

The present embodiments generally relate to an apparatus for removing hydrocarbons, contaminates or combinations thereof, such as heavy metals, from soil, particulate, sludge, liquids, or combinations thereof. The present apparatus can be modular and transportable.

BACKGROUND

A need exists for a trailerable modular device for use with separate trailerable power units to remove heavy metals and hydrocarbons from dirt.

A further need exists for a compact assembly, unit, or combinations thereof that has one or more components that can move on a roadway without permits, but can remove hydrocarbons and heavy metals from dirt, sludge, or aqueous particulate.

A need exists for an assembly, unit, or combinations thereof for creating multi-sized clean particulate simultaneously using a floating system that is easily re-locatable to other locations.

The present embodiments meet these needs.

BRIEF DESCRIPTION OF THE DRAWINGS

The detailed description will be better understood in conjunction with the accompanying drawings as follows.

Figure 1:
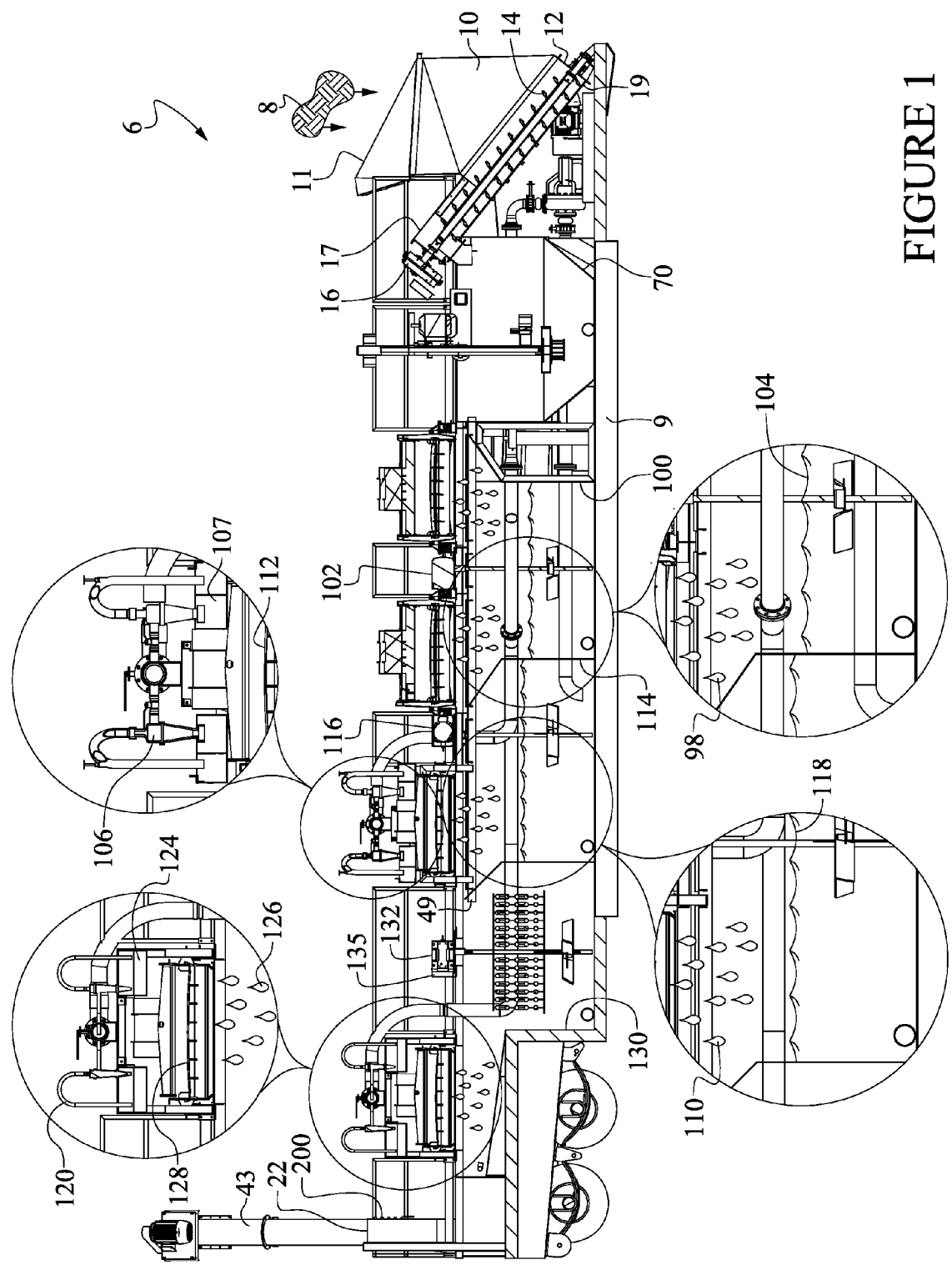
FIG. 1 is a side view of the apparatus for removing hydrocarbons and contaminates.

The present embodiments are detailed below with reference to the listed Figures.

DETAILED DESCRIPTION OF THE EMBODIMENTS

Before explaining the present apparatus in detail, it is to be understood that the apparatus is not limited to the particular embodiments and that it can be practiced or carried out in various ways.

The present embodiments relate to a hydrocarbon and/or heavy metal removal device for particulate, sludge and/or liquids that can be portable, transportable, trailer mountable or barge mountable, and can be modular for easy plug and play removal and re-installment of components on the trailer or the barge.

The apparatus for removing hydrocarbons and contaminates can remove hydrocarbons from soil or similar particulate. The removed hydrocarbons can be recovered. The recovered hydrocarbons can be used as fuel, such as biodiesel.

The apparatus for removing hydrocarbons and contaminates can also be configured to remove heavy metals, including dissolved heavy metals, from soil or similar particulate.

The particulate treated using the apparatus for removing hydrocarbons and contaminates can be sand, rock, similar material, or combinations thereof. The soil can also be a wet mixture, such as a wet mixture with water, a wet mixture mixed with a diesel fuel, or soil mixed with a particulate that contains liquid hydrocarbons.

The apparatus for removing hydrocarbons and contaminates can include one or more components that are portable. For example, the apparatus for removing hydrocarbons and contaminates can include one or more components that are trailer mounted, and the trailer mounted components can be highway legal. Accordingly, a tractor can move each trailer mounted component without need for extra permits. In one or more embodiments, the apparatus for removing hydrocarbons and contaminates can include one or more components that are skid mounted.

The apparatus for removing hydrocarbons and contaminates can have a closed loop water system, allowing water to be reused within the apparatus for removing hydrocarbons and contaminates.

The apparatus for removing hydrocarbons and contaminates can include a hopper. The hopper can have a hopper top wider than a hopper bottom, forming a V-shape or funnel-shaped device. The hopper can receive dirt, sludge, and/or aqueous particulate, such materials are referred to herein as "particulate".

A material moving device can be used to move between one or more portions of the apparatus for removing hydrocarbons and contaminates. The material moving device can be an auger, a conveyor system, the like, or combinations thereof. The augur can be a shaftless auger or a shafted auger. The material moving device can be connected to a gear box with forward, neutral and reverse gears, and connected to a material moving device motor, which can be a variable speed motor. In embodiments, a trough can be at least partially disposed about the material moving device. The trough can be a removable sleeve. The material moving device can have a device top proximate to the top of the hopper and a device bottom proximate to the bottom of the hopper, such as at the most narrow point of the hopper. The material moving device can be a rotating material moving device. The material moving device can be oriented at an angle with a slope from about twenty degrees to about sixty degrees from the hopper axis.

A controller can connect to the material moving device motor to variably control the speed of the material moving device motor. The controller can communicate with a main control panel, which can also be located on the trailer.

In embodiments, the trailer can be a barge, a floating support vessel that floats, such as a floating platform, or a similar floating vessel, such as a drill ship or a heavy lift vessel.

A plurality of injection ports can be positioned adjacent to the material moving device in the hopper for introducing a first fluid, such as steam, to the particulate, thereby forming a first slurry. The first slurry can be moved into a separation tank. The separation tank can agitate the first slurry, allowing particulate to settle, thereby forming a contaminate and particulate effluent.

A first portion or an initial separation section can receive the first slurry in the separation tank, and first slurry can be moved using a device, such as a 1500 gallons per minute (gpm) pump offered by Tri-flo International, Inc. of Houston, Tex.

An extractor can be disposed in the first portion of the separation tank. The extractor can be an adsorbent or an absorbent, such as those taught in U.S. Pat. No. 7,329,360, which is incorporated herein by reference. Other extractors, such as a filter, can be disposed within the first portion of the separation tank to remove contaminates.

A separation tank pump can be connected to a fluid supply loop and a fluid injection port for injecting fluid into the first slurry of the hopper to make the separation faster and to recycle water used in the process.

The separation tank can have a separation tank outlet port for flowing the effluent out of the separation tank.

The separation tank can have an agitator port for recalculating the first slurry from the initial separation section through the fluid supply loop. The agitator port can agitate fluid without the need of a bladed mixer.

In one or more embodiments, at least one scalper screen can receive particulate effluent and can separate the particulate effluent into a first hydrocarbon extracted particulate with a diameter greater than 1000 microns, and can forms a second slurry. The scalper screen can receive the particulate effluent and can screen off the first hydrocarbon extracted particulate, thereby allowing the second slurry with less than 1000 microns to traverse to the scalper tank. The first hydrocarbon extracted particulate larger than or equal to 1000 microns can thereby traverse to the ancillary location and/or to a material removal device.

At least one scalper tank with a scalper agitator can receive the second slurry and can keep the second slurry in suspension.

At least one de-siltering hydrocyclone can receive the second slurry suspension and can remove a second hydrocarbon extracted particulate with a diameter greater than 75 microns, thereby forming a third slurry. The de-silting hydrocyclone can be any hydrocyclone used in the art.

A desilting screen can receive the second hydrocarbon extracted particulate and can screen off the second hydrocarbon extracted particulate, thereby allowing the third slurry with less than 75 microns to traverse to the desilting tank, and allowing the second hydrocarbon extracted particulate larger than or equal to 75 microns to traverse to the ancillary location and/or the material removal device.

The desilting tank can have a desilting agitator, which can be used to create an agitated third slurry.

A plurality of clay extractors can receive the agitated third slurry and can remove a third hydrocarbon extracted particulate with a diameter greater than 10 microns to form a fourth slurry.

A clay screen can receive the third hydrocarbon extracted particulate and can screen off the third hydrocarbon extracted particulate, thereby allowing the fourth slurry with less than 10 microns to traverse to the clay slurry tank, and allowing the third hydrocarbon extracted particulate larger than or equal to 10 microns to traverse to the ancillary location and/or the material removal device.

The clay slurry tank with clay agitators can receive the fourth slurry and can heat the fourth slurry with a clay slurry heating device connected to the controller, thereby forming a heated forth slurry. The heated fourth slurry can flow to a desilting tank, to at least one of the scalper tanks, to the initial separation section, or to combinations thereof.

A main control panel with circuit breakers can be connected to a circuit board and can be used to actuate, stop, and variably control the apparatus for removing hydrocarbons and contaminates using a power supply on the trailer. For example, the main control panel can control the plurality of agitators and the plurality of pumps.

The power supply can be any power source adapted to power one or more components, such as a solid separation unit, of the apparatus for removing hydrocarbons and contaminates. The power supply can be disposed on a trailer, and the trailer can include a heating unit, a generator, a fuel tank, or combinations thereof.

The controller can have a processor powered by a controller power supply. The processor can be connected to a data storage. The data storage of the controller can have computer instructions to instruct the controller processor to increase or decrease the speed of the material moving device motor, to increase or decrease the speed at which the material moving device moves the particulate, or to increase or decrease the rate of flow of particulate through the entire process.

A remote control can be used with the controller. The remote control can provide instructions to the controller while being operated a distance from the apparatus for removing hydrocarbons and contaminates. For example, the remote control can communicate with the controller via wireless or wired telemetry, such as radio frequency, fiber optics, or microwaves.

In embodiments, the controller can include a controller transmitter/receiver for receiving communication signals to cause the various motors and pumps of the apparatus for removing hydrocarbons and contaminates to start, stop, speed up, or slow down. The remote control can have a remote control transmitter/receiver for providing wireless remote control signals to the controller to cause the motors and pumps to start, stop, speed up, or slow down. The remote control can be a wired pendant remote control or a wireless remote control.

The remote control can include a remote control circuit board connected to a remote control power supply. The remote control circuit board can communicate with at least one of the remote control transmitter/receivers, a remote control on/off switch, an increase speed potentiometer, a decrease speed potentiometer, and a display. The remote control can have an "on switch", an "off switch", and a "speed control knob" for transmitting increase or decrease speed signals to the controller.

A material moving motor emergency stop can be directly connected to the material moving motor.

A trough can be disposed around the material moving device for assisting in flowing the input material to the separation tank.

The first fluid can be injected into the input material from a first fluid source. The first fluid source can contain a vapor, such as steam; a liquid, such as an amine containing emulsion breaker liquid; diesel oil; or combinations thereof.

A removable sleeve can be disposed within the trough and can support the plurality of injection ports. The removable sleeve can be from about 0.01 inches to about 250 inches long; can have a wall thickness from about 0.25 inches to about 1 inch; and can be made of steel or another non-deforming high weight supporting material, such as a rib reinforced polymer. In one or more embodiments, the removable sleeve can extend from one end of the trough to an opposite end of the trough longitudinally or laterally. The removable sleeve can be made from or at least coated with a hard sliding material, such as Teflon™. The removable sleeve can have a diameter greater than the material moving device and less than the trough. The removable sleeve can be made of high density polyethylene with a thickness from about 0.25 inches to about 1 inch.

In embodiments, the first fluid can be a heated fluid, such as a fluid heated from a remote boiler or the like. The first fluid can be heated to a temperature from about 50 degrees Fahrenheit to about 550 degrees Fahrenheit.

A desilting trough can be used to receive the third slurry from the desilting hydrocyclone and to pass the third slurry to the desilting tank. The desilting trough can have a length from about 25 feet to about 50 feet, an inner diameter from about 0.25 feet to about 30 feet, and a wall thickness from about 0.30 inches to about 1 foot.

In one or more embodiments, that apparatus can include a clay trough for receiving the fourth slurry from the clay extractors and for passing the fourth slurry to the clay slurry tank to prevent spillage and to facilitate movement of the fluid. The apparatus can include from about twenty clay extractors to about sixty clay extractors. In one or more embodiments, a pump, such as a centrifugal pump, can be used instead of the clay trough. For example, a fourth slurry pump can be used instead of the clay trough.

The clay slurry heating device can be a fin fan heater actuated by a heated fluid or another heat exchanger actuated by the heated fluid. The clay slurry heating device can directly or indirectly exchange heat with the clay slurry.

At least one light can be used to maintain continuous use of the apparatus for removing hydrocarbons and contaminates during day and night. The light can be connected to the power supply.

In embodiments, walls of the clay slurry tank can extend higher than the desilting tank but can allow fluid from the clay slurry tank to flow into the desilting tank when fluid in the clay slurry tank exceeds a preset limit.

In embodiments, walls of the desliting tank can extend higher than the scalper tank but can allow fluid in the desilting tank to flow into the scalper tank when fluid in the desilting tank exceeds a preset limit.

In embodiments, the fourth slurry can flow into a fluid trough for recycling into the separation tank.

The apparatus for removing hydrocarbons and contaminates can include one or more material removal devices for receiving a first hydrocarbon extracted particulate, a second hydrocarbon extracted particulate, and a third hydrocarbon extracted particulate, and for flowing the hydrocarbon extracted particulates to an ancillary location.

The apparatus for removing hydrocarbons and contaminates can be disposed on a floating hydrocarbon removal mobile vessel, such as a custom built barge with tanks that are made from the hulls of the vessel. In embodiments, the apparatus for removing hydrocarbons and contaminates can be mounted on a floating support vessel and can have replaceable modular components.

The apparatus for removing hydrocarbons and contaminates can include a dewatering centrifuge to receive the fourth slurry and to apply a centrifugal force for separation of particulate and liquid.

FIG. 1 is a side view of the apparatus for removing hydrocarbons and contaminates. The apparatus for removing hydrocarbons and contaminates 6 can be disposed on one or more trailers 9.

A hopper 10 can be removably and modularly mounted to the trailer 9. The hopper 10 can have a hopper top 11 and a hopper bottom 12. Input material 8 is depicted flowing into the hopper 10.

The material moving device 14 can be at least partially disposed within the hopper 10. The material moving device 14 can have a device top 17 and a device bottom 19. A gear box 16 can be connected to the material moving device 14.

The separation tank 70 can be used to receive material from the material moving device 14. A scalper tank 100 with a scalper agitator 102, a second slurry 98, and a second slurry suspension 104 is shown.

Also depicted is a desilter tank 114 with a desilting agitator 116, a third slurry 110, and an agitated third slurry 118. Above the desilter tank 114 is a desilting hydrocyclone 106 with a desilting trough 107 and a desilting screen 112.

Clay extractors 120 are shown with a clay trough 124, a fourth slurry 126, a clay agitator 132, and a clay screen 128, all disposed above a clay slurry tank 130. A fluid trough 49 is shown, for moving fluid from the clay slurry tank 130 to the separation tank 70. A fourth slurry pump 135 is also shown for moving fluid from the clay slurry tank 130 to the separation tank 70.

Also depicted are a material removal device 43, a controller 22, and a main control panel 200.

Figure 2:
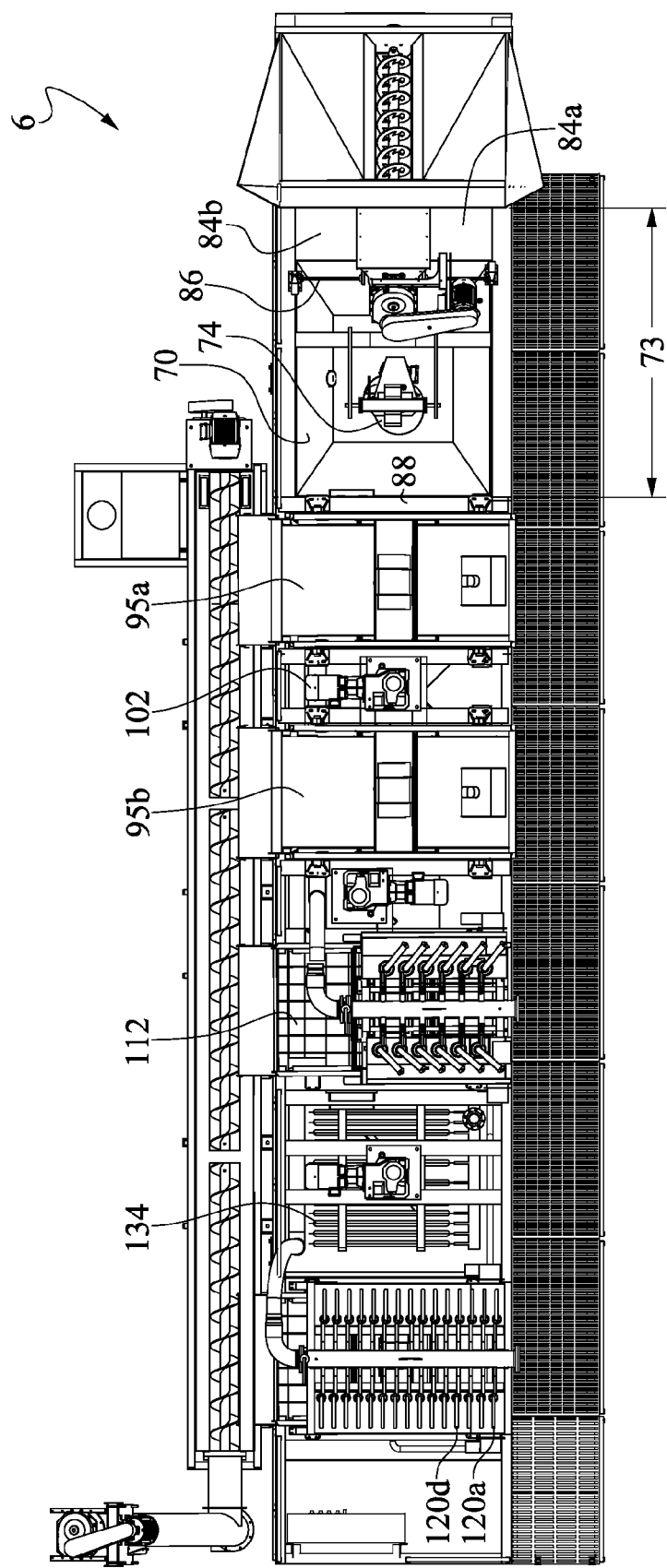
FIG. 2 is a top view of the apparatus for removing hydrocarbons and contaminates.

FIG. 2 is a top view of an embodiment of the apparatus for removing hydrocarbons and contaminates 6. Contaminate recovery sections 84a and 84b are shown.

A divider 86, a water spray bar 88, an initial separation section 73, a separation tank pump 74, and the separation tank 70 are depicted.

The apparatus for removing hydrocarbons and contaminates 6 can also include one or more scalper screens 95a and 95b, one or more devices 134, one or more scalper agitators 102, one or more desilting screens 112, and one or more clay extractors 120a and 120b.

Figure 3:
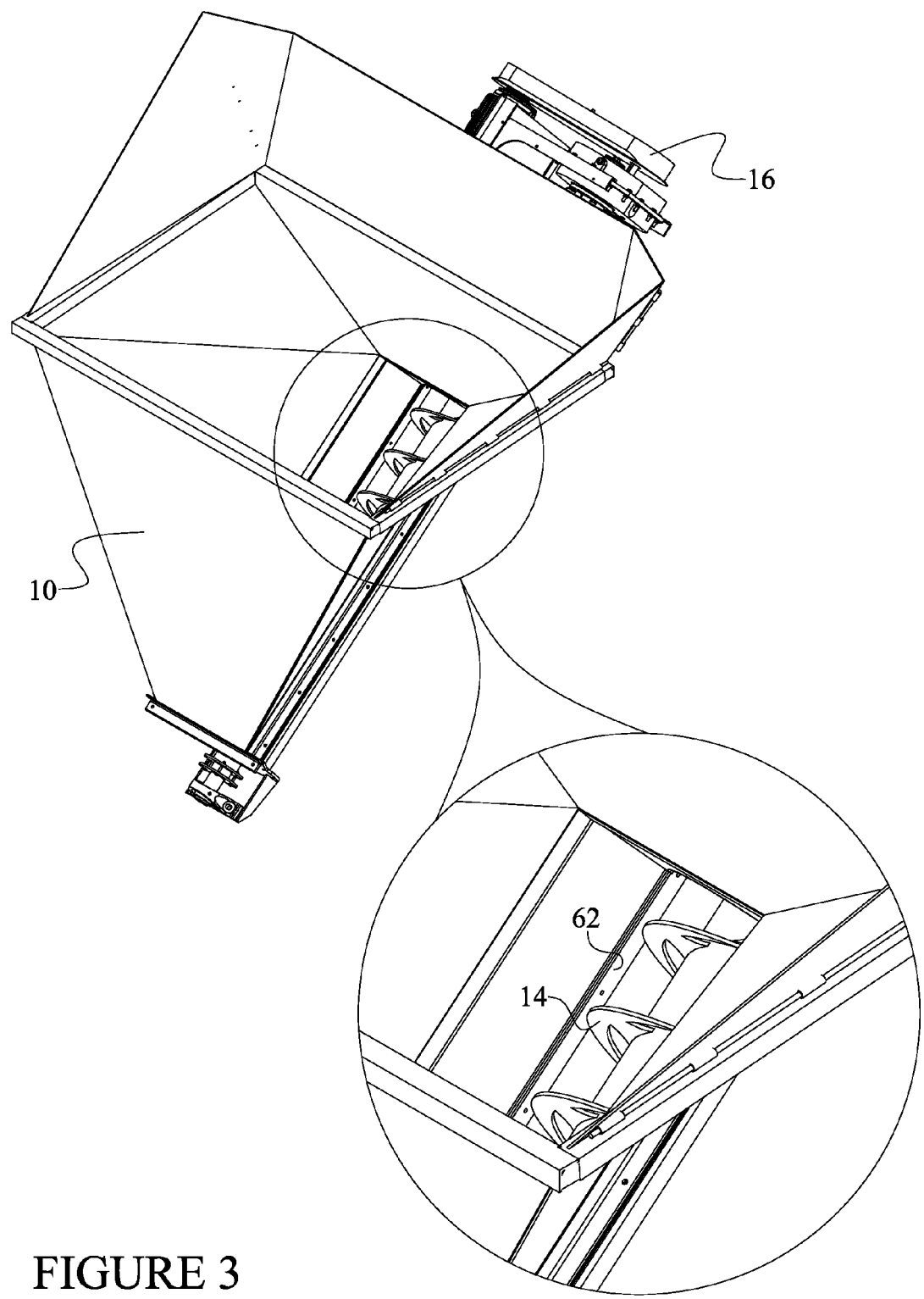
FIG. 3 is a detailed view of the intake of the apparatus for removing hydrocarbons and contaminates.

FIG. 3 depicts an embodiment of the hopper 10 and the material moving device 14 with the gear box 16 and a removable sleeve 62. The removable sleeve 62 can be disposed within a trough, shown in later Figures, disposed around the material moving device 14.

Figure 4:
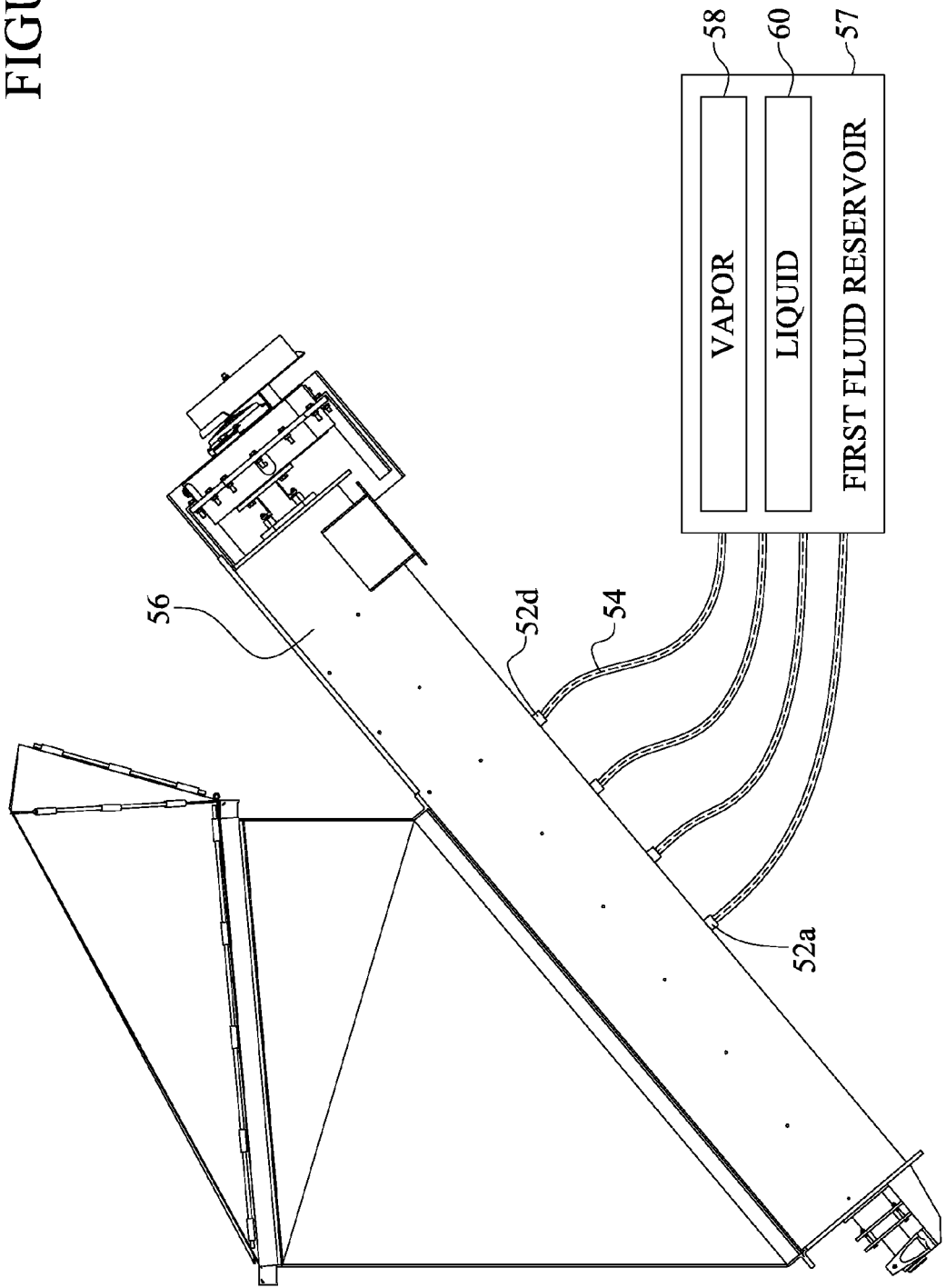
FIG. 4 is a detail of the trough around an auger of the intake portion of FIG. 1.

FIG. 4 depicts an embodiment of the trough 56 disposed around the material moving device for providing the first fluid 54 to the input material in a concentrated and directed manner.

A plurality of injection ports, including injection ports 52a and 52d, are depicted disposed within the trough 56. Further-more, a first fluid reservoir 57 can be in fluid communication with the trough 56. Vapor 58 and liquid 60 are shown within the first fluid reservoir 57.

Figure 5:
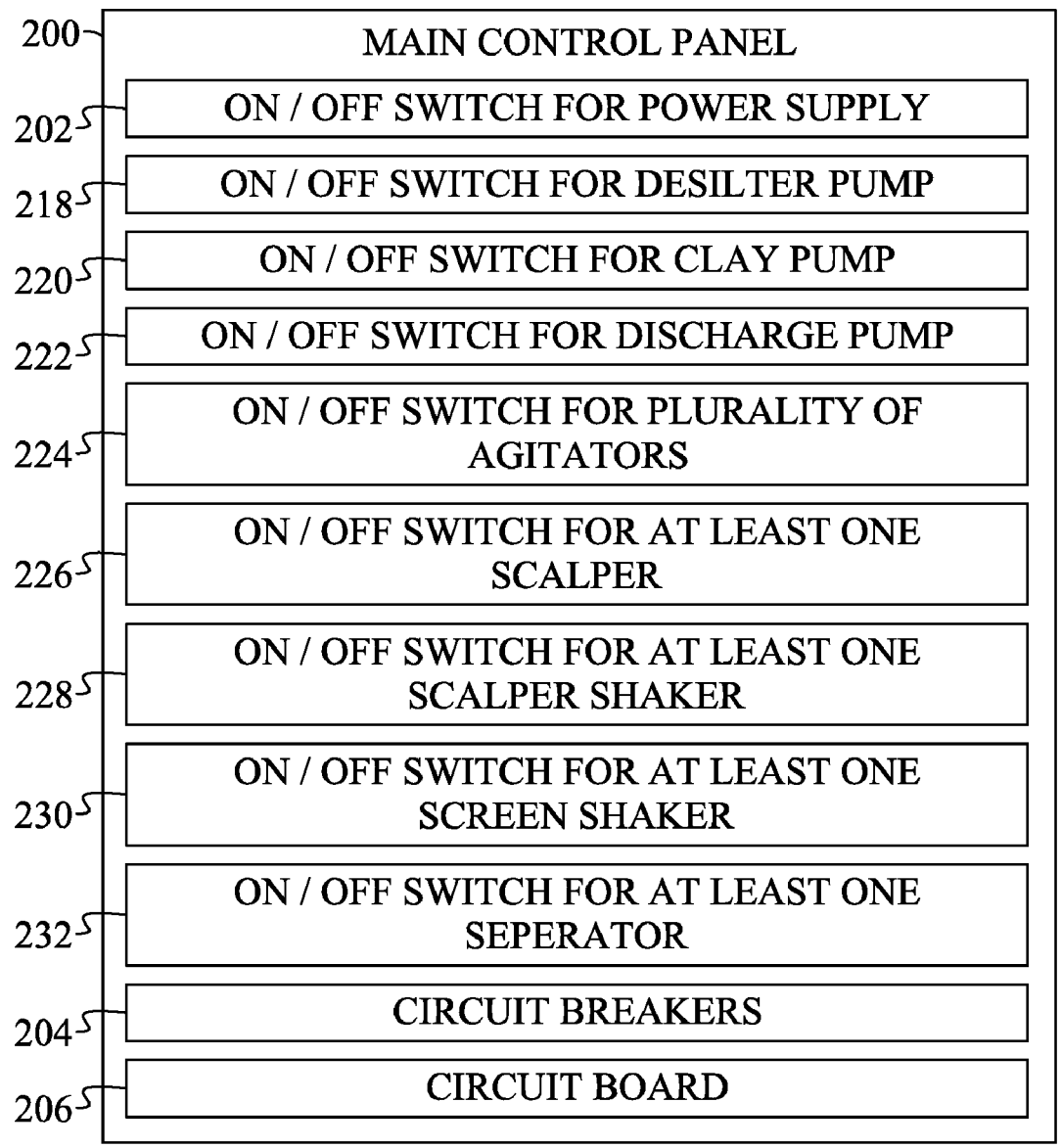
FIG. 5 is a detail of the internals of a main control panel used in FIG. 1.

FIG. 5 depicts an embodiment of the main control panel 200. The main control panel 200 is shown with an on/off switch for the power supply 202, an on/off switch for the desilter pump 218, an on/off switch for the clay pump 220, an on/off switch for the discharge pump 222, an on/off switch for each of the plurality of agitators 224, an on/off switch for at least one scalper 226, an on/off switch for the at least one scalper shaker 228, an on/off switch for at least one screen shaker 230, and an on/off switch for at least one separator 232. The main control panel 200 is also depicted with circuit breakers 204 and a circuit board 206.

Figure 6:
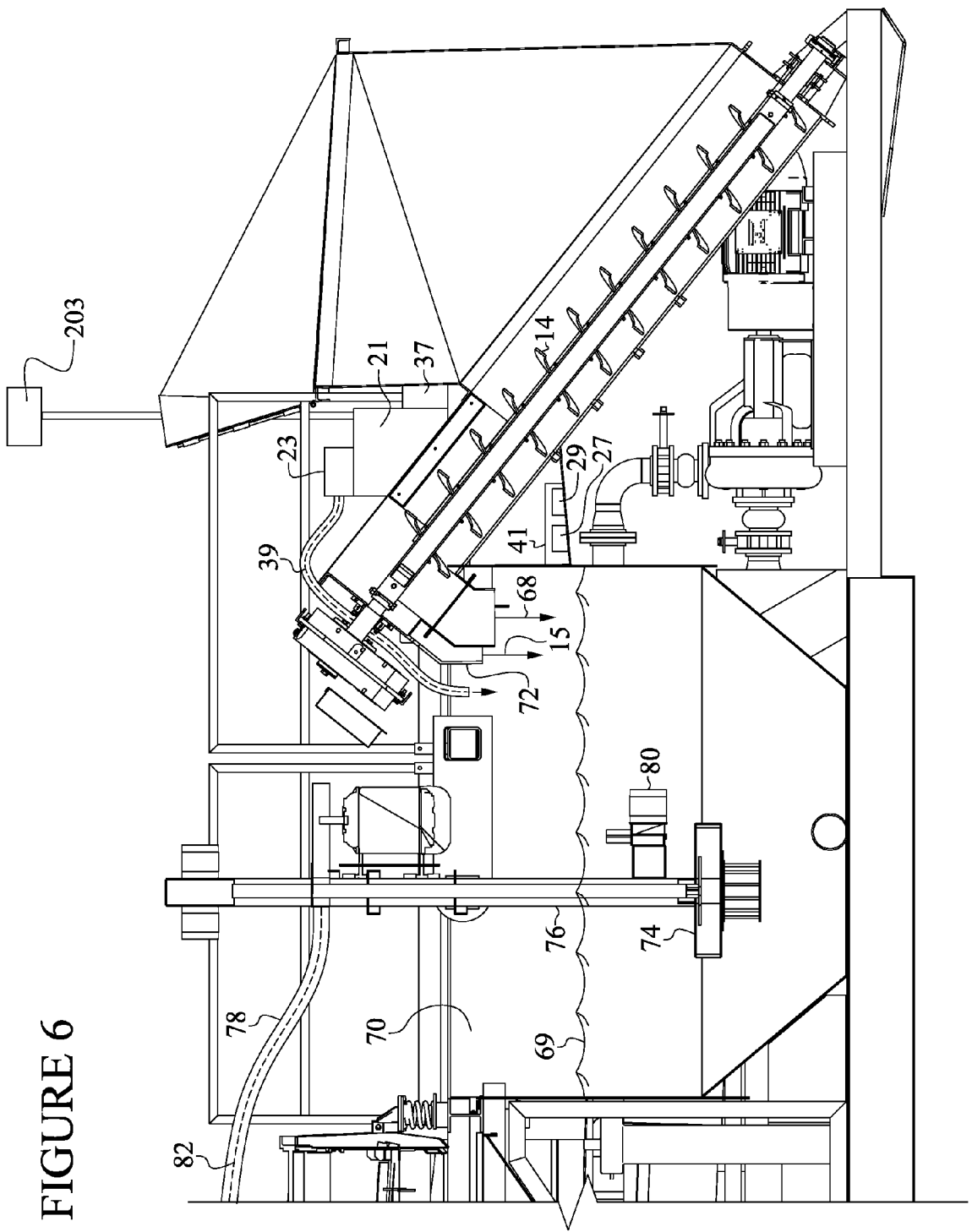
FIG. 6 is a detail of a separation tank usable in the apparatus for removing hydrocarbons and contaminates.

FIG. 6 depicts an embodiment of the separation tank 70. A first slurry 68 is shown flowing from the material moving device 14 into the separation tank 70. A fluid injection port 72 for flowing fluid 15 into the separation tank 70 can be seen proximate the location where the first slurry 68 flows into the separation tank 70.

Separation tank pump 74 is disposed within the separation tank 70 and connected to fluid supply loop 76. Agitator port 80 is also depicted. Separation tank outlet 78 is shown for flowing particulate effluent 82 from the separation tank 70. Contaminate 69 is also depicted within the separation tank 70.

FIG. 6 also depicts a light 203, an extractor 41, adsorbent material 27, absorbent material 29, fluid pump 21, and contaminate recovery section second outlet 37. The fluid pump 21 can be connected to the contaminate recovery section second outlet 37 for flowing contaminate 69 from the contaminate recovery section through a filter 23 forming a recycle fluid 39, and further for reintroducing the recycle fluid 39 to a member of the group consisting of: the initial separation section, the scalper tank, the desilting tank, the clay slurry tank, or combinations thereof.

Figure 7:
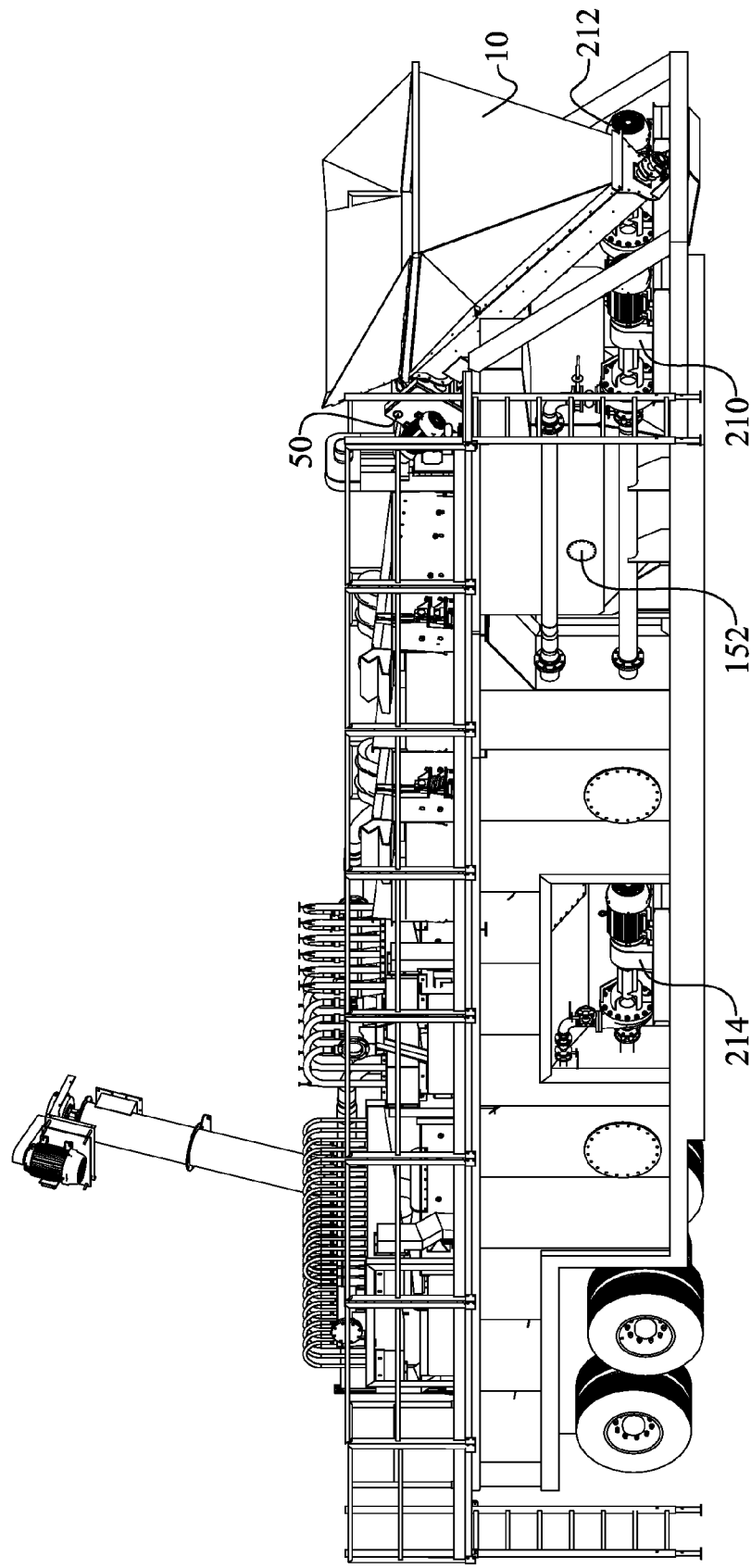
FIG. 7 is a view showing a separation tank pump motor used with the apparatus for removing hydrocarbons and contaminates.

FIG. 7 shows the desilting pump 210, the clay pump 212, and the discharge pump 214 disposed on the a side view of the apparatus for removing hydrocarbons and contaminates. Also shown are the material moving motor emergency stop 50, the hopper 10, and the heated fluid dispersal manifold 152.

Figure 8:
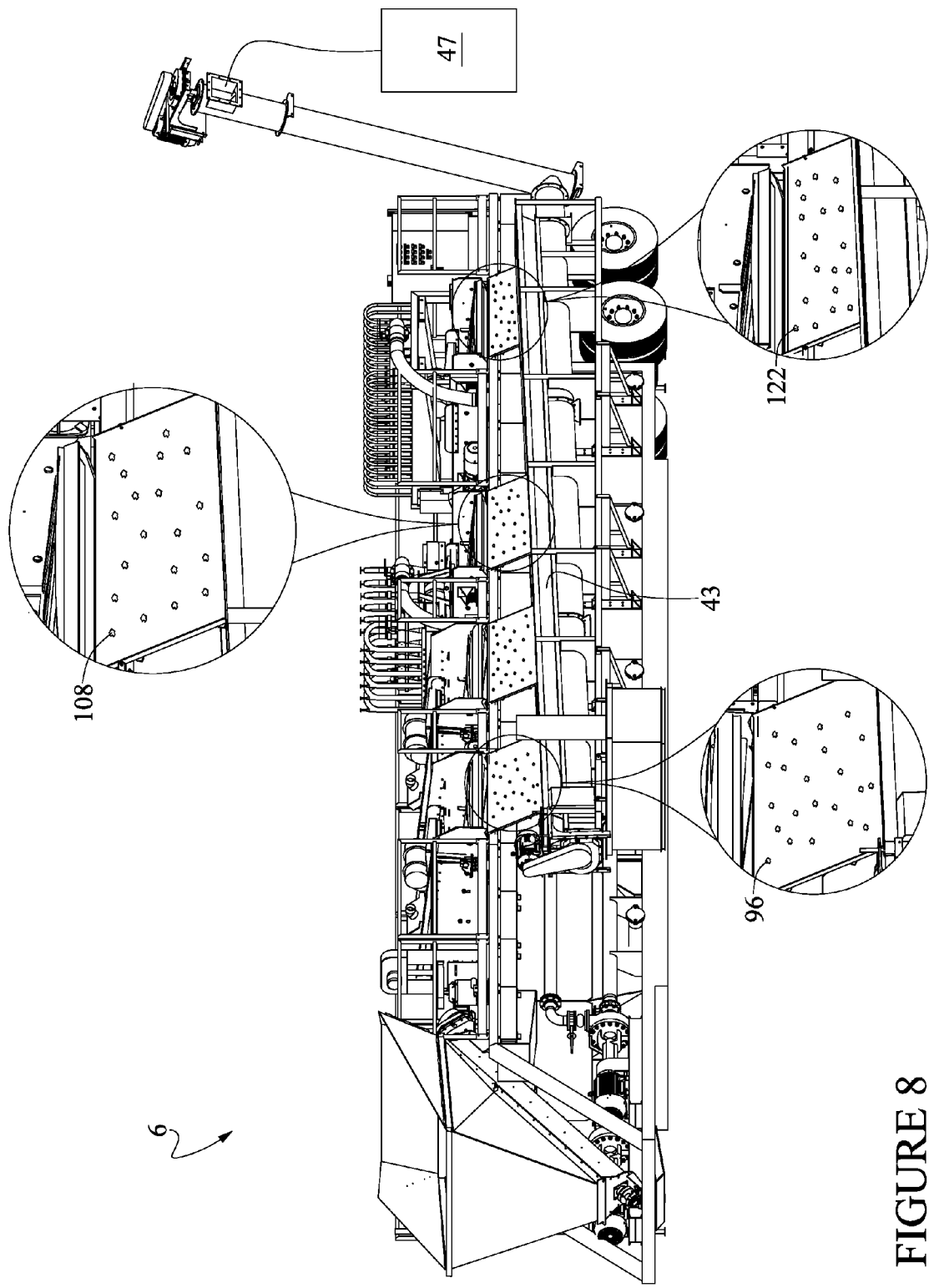
FIG. 8 is a right side isometric view of a trailer mounted apparatus for removing hydrocarbons and contaminates.

FIG. 8 is a right side isometric view of an embodiment of the a side view of the apparatus for removing hydrocarbons and contaminates 6 showing the material removal device 43 and the ancillary location 47. The first hydrocarbon extracted particulate 96, the second hydrocarbon extracted particulate 108 and the third hydrocarbon extracted particulate 122 are depicted flowing to the material removal device 43.

Figure 9:
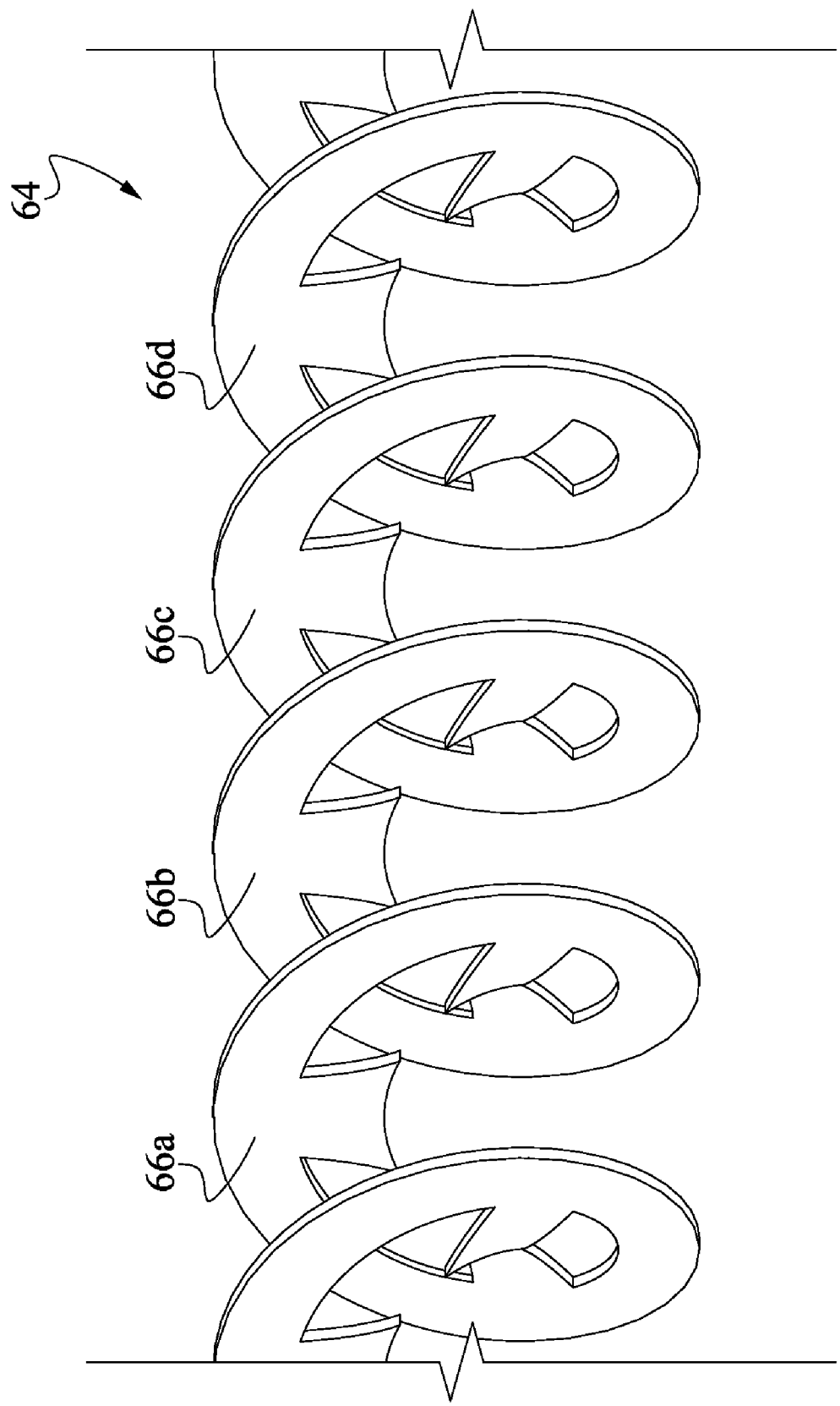
FIG. 9 is a detailed view of a shaftless auger usable in the apparatus for removing hydrocarbons and contaminates.

FIG. 9 is a detailed view of an embodiment of the shaftless auger 64 with flightings 66a-66d.

Figure 10:
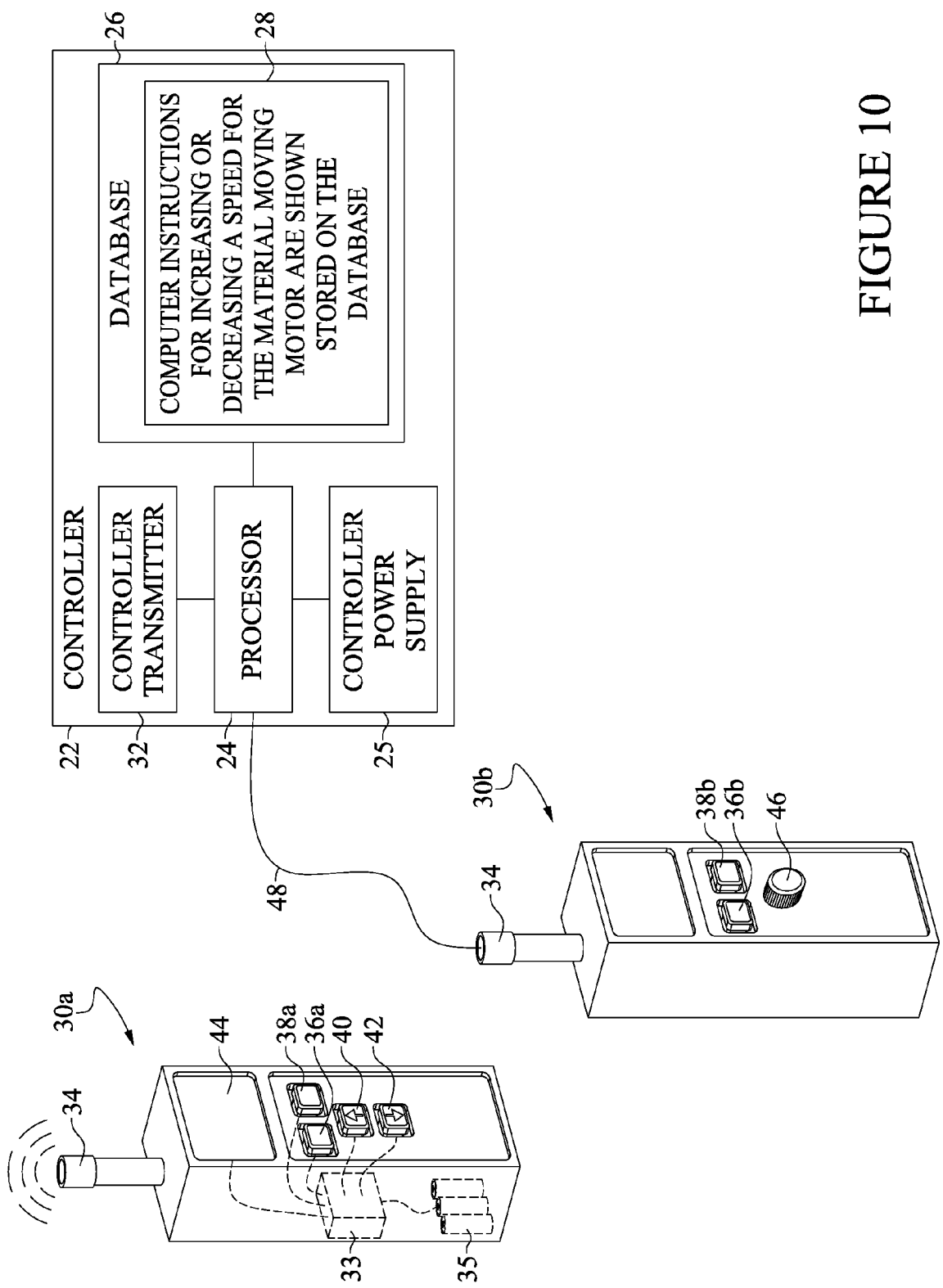
FIG. 10 is a diagram of the controller with remote control device usable in the apparatus for removing hydrocarbons and contaminates.

FIG. 10 is a diagram of the controller 22 with a remote control device 30a usable with the apparatus for removing hydrocarbons and contaminates. The remote control device 30a has an increase speed potentiometer 40, a decrease speed potentiometer 42, a display 44, a remote control power supply 35, remote control on and off switches 36a and 38a, a remote control circuit board 33, and a transmitter/receiver 34.

A remote control device 30b is depicted with a remote control on switch 36b, a remote control off switch 38b, and a speed control knob 46.

The controller 22 is depicted with a controller transmitter 32 for communicating with the transmitter/receiver 34. An electrical signal cable 48 is shown connecting the remote control device 30b with a processor 24, for providing communication between the remote control device 30b and the controller 22. A database 26 is shown within the controller 22 in communication with the processor 24. Computer instructions 28 for increasing or decreasing a speed for the material moving device are shown stored on the database 26. The controller 22 is also shown with a controller power supply 25.

Figure 11:
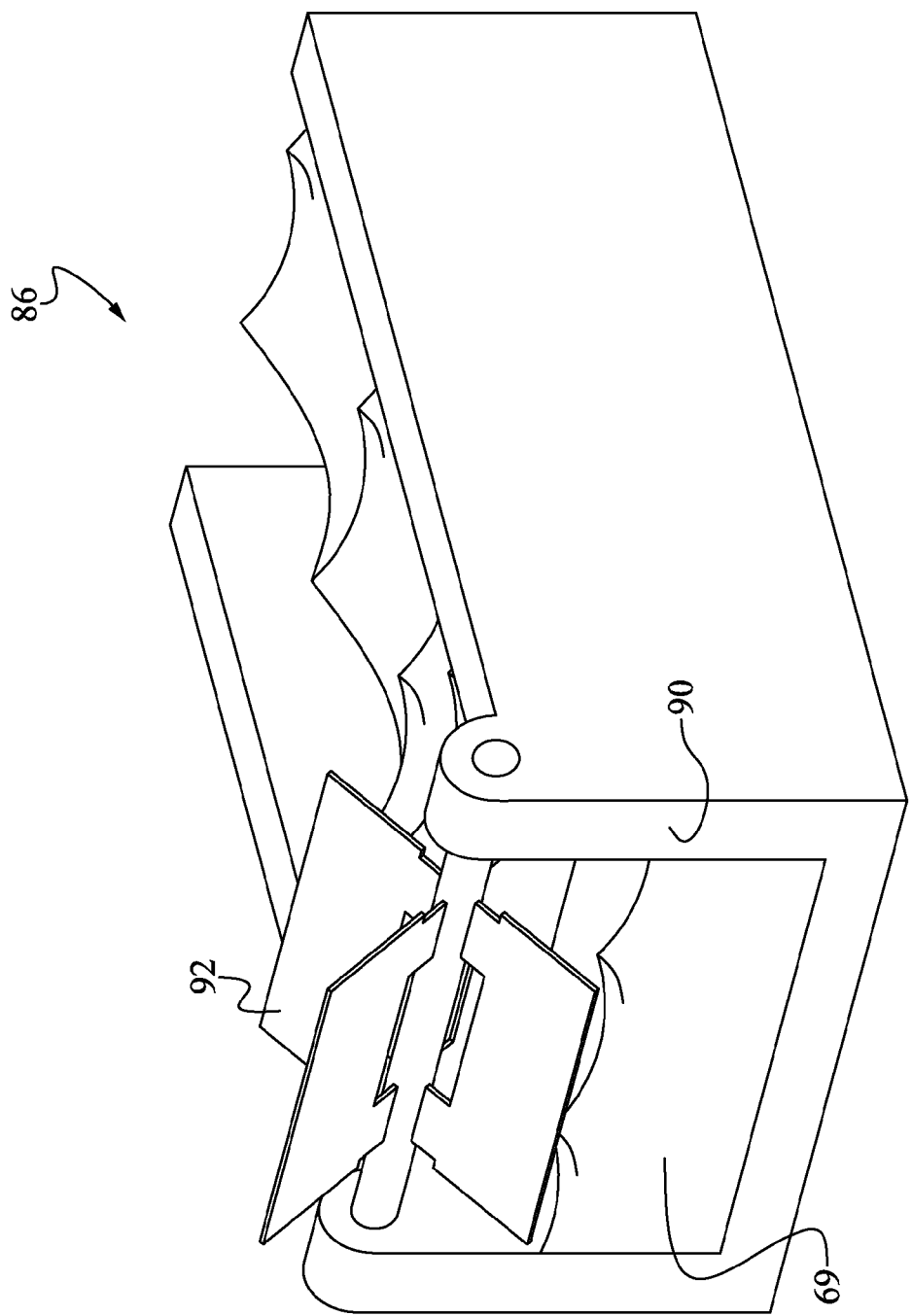
FIG. 11 is a detail of a divider with a rotating paddlewheel.

FIG. 11 depicts a detailed view of an embodiment of the divider 86 with a rotating paddlewheel 92 disposed above a weir 90. The contaminate 69 is shown within the weir 90.

Figure 12:
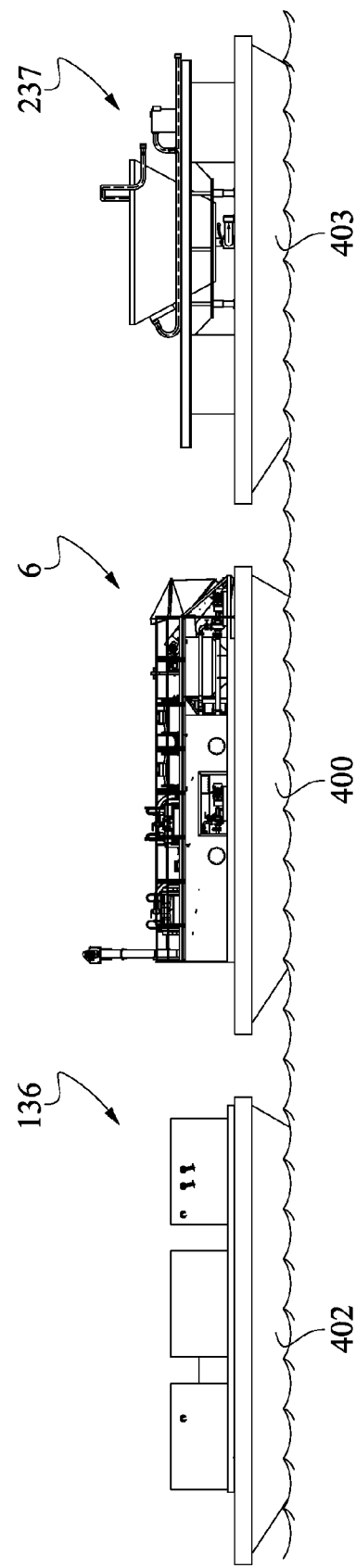
FIG. 12 depicts an embodiments of an apparatus for removing hydrocarbons and contaminates disposed on floating vessels.

FIG. 12 depicts an embodiment of an apparatus for removing hydrocarbons and contaminates disposed on one or more floating vessels. The first floating support vessel 400 is shown with the apparatus for removing hydrocarbons and contaminates unit 6. The second floating support vessel 402 is shown with the heating and power support unit 136. The third floating support vessel 403 is shown with the clarifying mobile unit 237. Any of the various tanks of the system can be formed integrally with the hull of the vessels.

Figure 13:
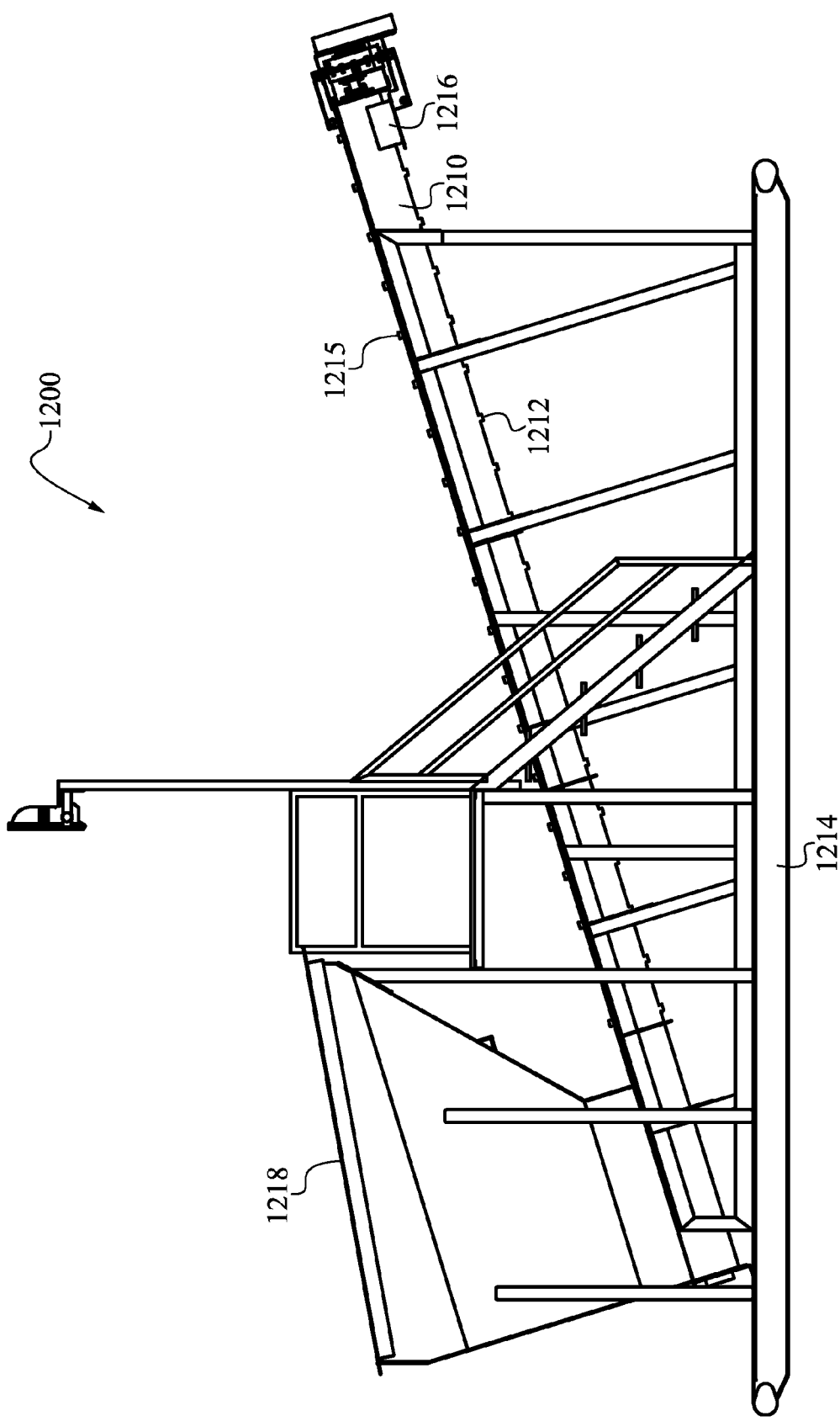
FIG. 13 depicts an illustrative hopper assembly that can be used with one or more embodiments of an apparatus for removing hydrocarbons and contaminates.

FIG. 13 depicts an illustrative hopper assembly that can be used with one or more embodiments of an apparatus for removing hydrocarbons and contaminates. The hopper assembly 1200 can include a hopper 1218, a hopper assembly platform 1214, a trough 1210, and a material moving device 1215.

The hopper 1218 can be in communication with the trough 1210. The hopper 1218 can have a volume from about one cubic foot to about twelve-hundred cubic feet. The hopper 1218 can be connected to the hopper assembly platform 1214. For example, one or more portions of the hopper 1218 can be welded, bolted, or otherwise mechanically fastened to the hopper assembly platform 1214. The hopper 1218 can include one or more injection ports (not shown) that can be used to apply liquid or vapor to the material within the hopper 1218. The liquid or vapor can be injected into a portion of the hopper 1218 at a pressure from about one pound per square inch to about twelve-hundred pounds per square inch. The hopper 1218 can be substantially similar to one or more hoppers described herein.

The hopper assembly platform 1214 can be configured to be moved by a fork lift, a crane, a tractor, a vehicle, another moving device, or combinations thereof. For example, the hopper assembly platform 1214 can be a skid or a trailer. In one or more embodiments, one or more wheels can be used to support the hopper assembly platform 1214 and to allow for movement of the hopper assembly platform 1214. The hopper assembly platform 1214 can have a width of less than about fifteen feet.

The trough 1210 can have one or more injection ports 1212. The injection ports 1212 can be disposed in one or more portions of the trough 1210. The injection ports 1212 can be used to provide liquid, vapor, or combinations thereof to material within the trough 1210. The trough 1210 can have a discharge 1216. The discharge 1216 can have one or more nozzles or orifices disposed therein.

The material moving device 1215 can be at least partially disposed within the trough 1210. The material moving device 1215 can be an augur, a conveyor, or the like. The material moving device 1215 can be substantially similar to one or more material moving device described herein.

Figure 14:
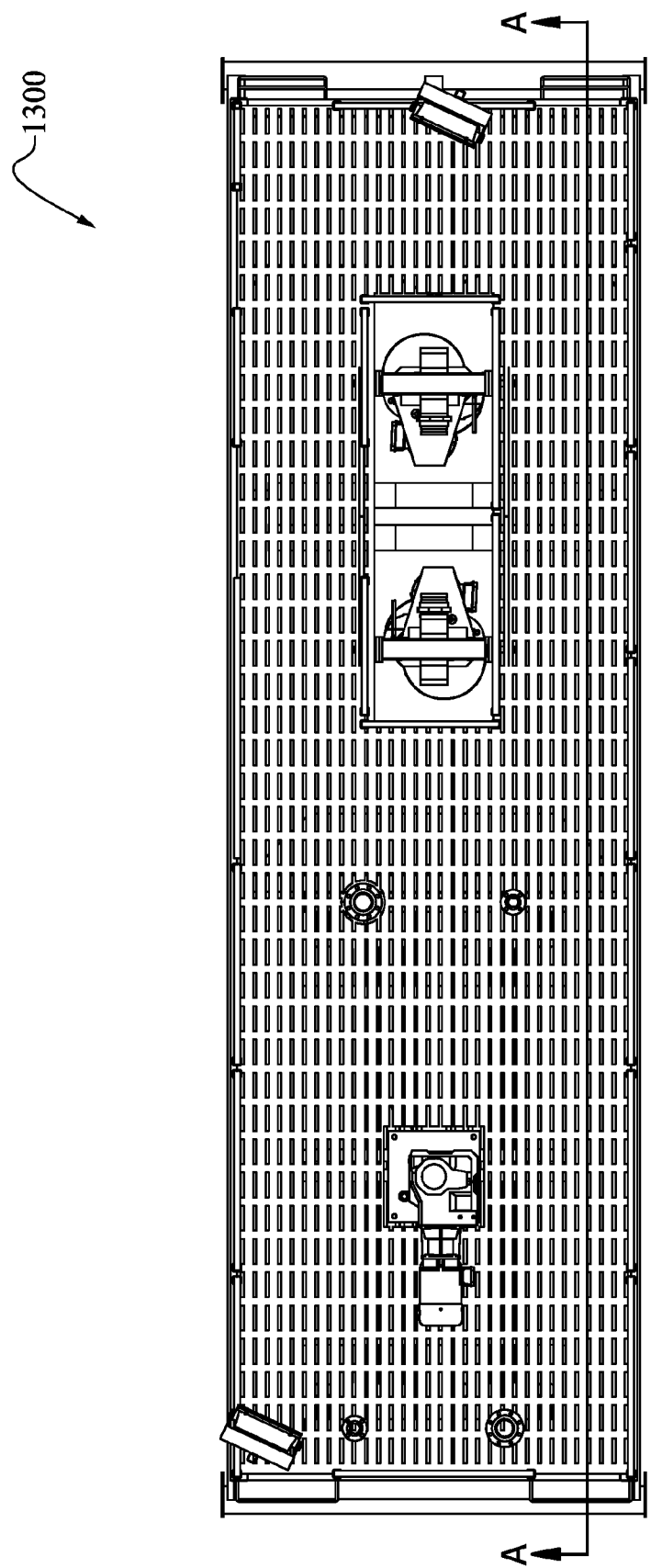
FIG. 14 depicts an illustrative separation tank.
Figure 15:
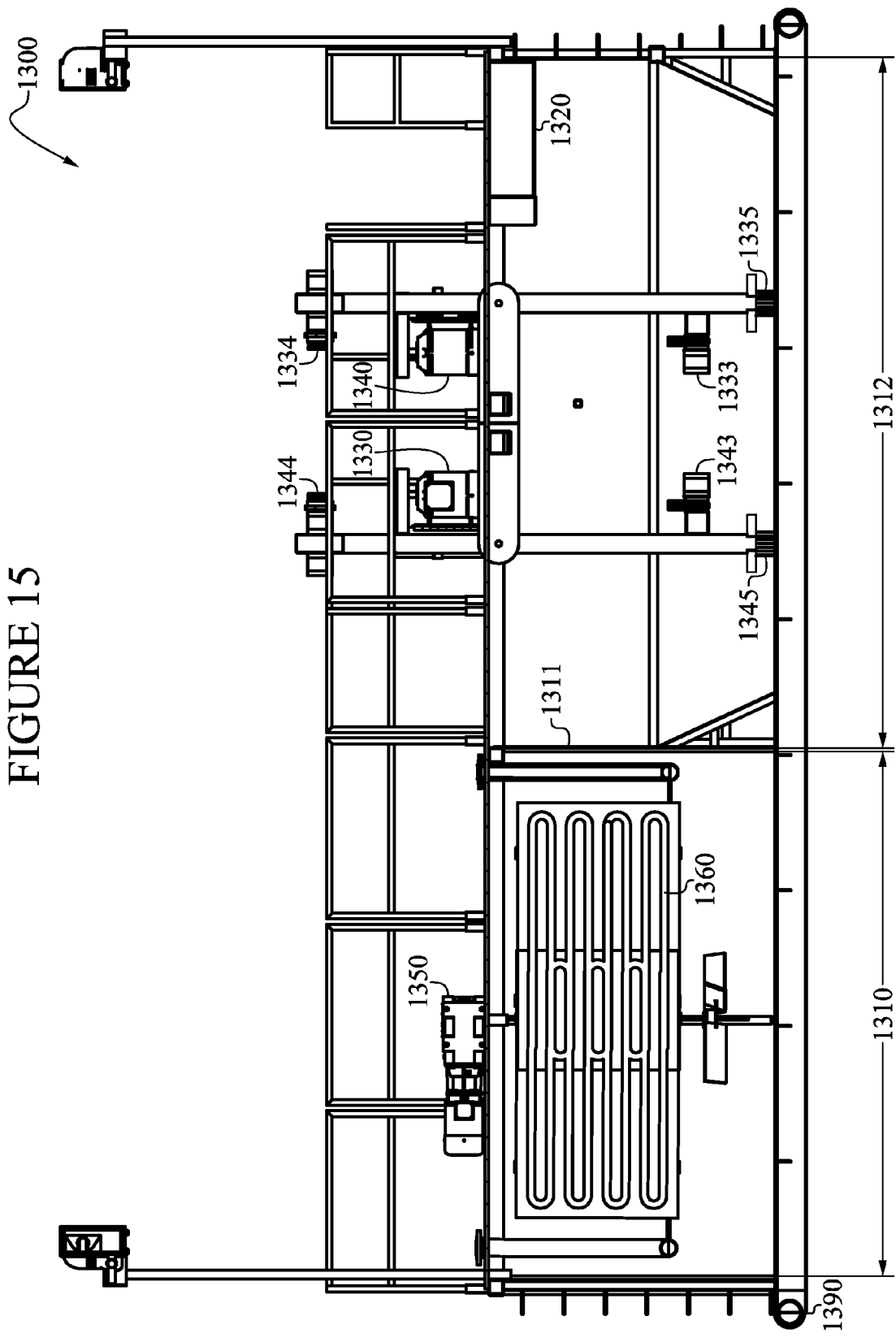
FIG. 15 depicts a cut view along line A-A of the separation tank of FIG. 14.

FIG. 14 depicts an illustrative separation tank and FIG. 15 depicts a cut view along line A-A of the separation tank of FIG. 14. Referring now to FIG. 14 and FIG. 15, the separation tank 1300 can include a first portion 1312, a second portion 1310, a divider 1311, an agitator 1350, a first separation tank pump 1340, a second separation tank pump 1330, an extractor 1320, and a heating element 1360. The separation tank 1300 can be disposed on a transportable platform 1390 such as a trailer or a skid.

The first portion 1312 can be separated from the second portion 1310 by the divider 1311. The divider 1311 can be substantially similar to one or more dividers disclosed herein. For example, the divider 1311 can be a weir.

The agitator 1350 can be at least partially disposed within the second portion 1310. The agitator 1350 can be any agitator known to one skilled in the art. The heating element 1360 can be disposed within the second portion 1310. The heating element 1360 can exchange heat from a heated coil, a fluid, or vapor, with a fluid in the second portion. For example, the heating element 1360 can have one or more hollow tubular members or conduits with a heated liquid flowing therein. Accordingly, the heating element can heat a fluid within the second portion. The heating element 1360 can receive the heated liquid, vapor, or power from an auxiliary device, such as a boiler, a power supply integrated with the separation tank 1300, or a power supply mounted on a trailer. For example, the auxiliary device can be on a trailer, can be rig power, stationary power, or any other power supply or heating supply. The heating element 1360 can be substantially similar to one or more heating devices disclosed herein.

The first separation tank pump 1340 can be at least partially disposed within the first portion 1312. The first separation tank pump 1340 can have one or more first upper outlets 1334, one or more first inlets 1335, and one or more first agitator ports 1333. The first upper outlet 1334 can discharge a liquid, solid, slurry, or combinations thereof from the first portion 1312. The first inlet 1335 can have a flow rate therethrough allowing a portion of the liquid, solid, slurry, or combinations thereof to be discharged out of the first agitator port 1333 back into the first portion and another portion of the liquid, solid, slurry, or combinations thereof to be discharged out of the first portion by the first upper outlet 1334.

The second separation tank pump 1330 can be at least partially disposed within the first portion 1312. The second separation tank pump 1330 can have one or more second upper outlets 1344, one or more second inlets 1345, and one or more second agitator ports 1343. The second upper outlet 1344 can discharge a liquid, solid, slurry, or combinations thereof from the first portion 1312. The second inlet 1345 can have a flow rate therethrough allowing a portion of the liquid, solid, slurry, or combinations thereof to be discharged out of the second agitator port 1343 back into the first portion 1312, and allowing another portion of the liquid, solid, slurry, or combinations thereof to be discharged out of the first portion by the second upper outlet 1344.

The extractor 1320 can be at least one of: an adsorbent, a filter, a skimmer, and an absorbent. The extractor 1320 can be disposed in the first portion 1312.

Figure 16:
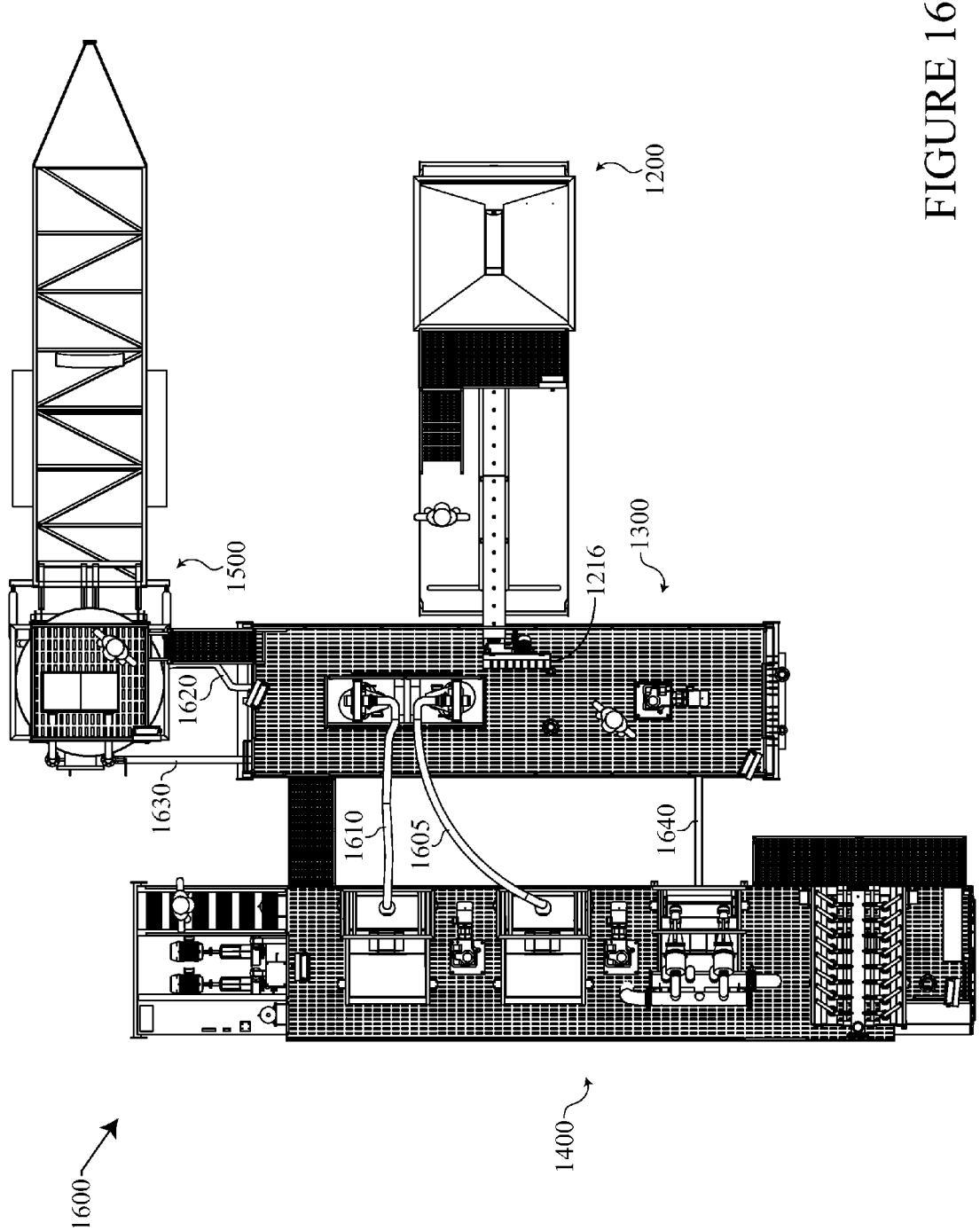
FIG. 16 depicts an illustrative apparatus for removing hydrocarbons and contaminates.

FIG. 16 depicts an illustrative apparatus for removing hydrocarbons and contaminates. The apparatus for removing hydrocarbons and contaminates 1600 can include the hopper assembly 1200, the separation tank 1300, a solid separation unit 1400, and a oil water separator unit 1500.

The solid separation unit 1400 can have one or more scalpers, one or more shaker screens, one or more screens, one or more hydrocyclones, one or more dewatering centrifuges, one or more clarifying tanks, or combinations thereof.

The oil water separator unit 1500 can be any device configured to separate hydrocarbons from water, which would be known to one skilled in the art with the aid of this disclosure.

The hopper assembly 1200 can be placed in communication with the separation tank 1300. The separation tank 1300 can be in communication with the solid separation unit 1400 and the oil water separator unit 1500.

In one or more embodiments, the first separation tank pump can be in communication with the separation tank 1300, via a first conduit 1605 in communication with the upper outlet, and the second separation tank pump can be in communication with the separation tank 1300, via a second conduit 1610 in communication with the second upper outlet.

In addition, the extractor can be in fluid communication with the oil water separator unit 1500 via a third conduit 1620. The separation tank 1300 can also be in fluid communication with the oil water separator unit 1500 via a fourth conduit 1630.

In operation, a contaminated particulate, such as sand contaminated with hydrocarbons, can be placed into the hopper. The trough can receive the contaminated particulate from the hopper, and the material moving device can transport the contaminated particulate to the separation tank 1300. As the contaminated particulate is transported to the separation tank 1300, liquid and/or vapor can be applied to the contaminated particulate via the injection ports, and the contaminates can be at least partially separated from the particulate due to the liquid and/or vapor.

The contaminated particulate can be discharged from the trough via the discharge 1216 into the first portion. The contaminated particulate can be mixed with a liquid, such as water, within the first portion, and the contaminate can be further separated from the particulate.

The contaminate can be separated from the particulate, and the contaminate can be removed using the extractor. The contaminate and a portion of the liquid can be sent to the oil water separator. The liquid can be separated from the contaminate in the oil water separator. The separated liquid can be transported to the second portion and heated using the heating device and agitated using the agitator.

The particulate can mix or partially mix with the liquid in the first portion and form a slurry, solid, liquid, or combinations thereof, which can be removed from the first portion via the first separation tank pump and the second separation tank pump. The liquid, slurry, solid, or combinations thereof can be transported via the conduits 1610 and 1605 to the solid separation unit 1400. The solid separation unit 1400 can separate the slurry into solid particulate and liquids. The solid particulate can be discharged for use and the liquid can be recycled back to the second portion via one or more conduits 1640.

Accordingly, the apparatus for removing hydrocarbons and contaminates can be used to perform a method for removal of hydrocarbons from a particulate, slurry, or sludge. The method can include applying steam, vapor, liquid, or combinations thereof to a contaminated particulate as the contaminated particulate is moved from a hopper to a separation tank. The method can also include mixing the contaminated particulate with liquid in the separation tank and separating at least a portion of the contaminate from the particulate. The method can also include removing the contaminate and drying the particulate.

The method can include continuously flowing particulate into a hopper, which has a hopper bottom smaller in diameter than a hopper top. The method can include moving the particulate at an adjustable rate of flow from the hopper bottom to the hopper top while at least intermittently injecting a vapor, liquid, or combinations thereof into the particulate, which can form a first slurry.

The method can also include agitating the first slurry by using a second fluid, while injecting water into the first slurry, and separating the first slurry into a contaminant and an effluent. The effluent can be screened and a first particulate can be removed from the contaminant. The first particulate can have a diameter greater than one thousand microns, thereby forming a second slurry.

The second slurry can be disposed in a suspension and simultaneously de-siltered into a second hydrocarbon extracted particulate with a diameter greater than 75 microns, thereby forming a third slurry.

The third slurry can be agitated to form an agitated third slurry while simultaneously removing a third hydrocarbon extracted particulate with a diameter greater than 10 microns from the agitated third slurry. A fourth slurry can be formed form the agitated third slurry.

The fourth slurry can be recycled and operated upon. For example, the fourth slurry can be heated and used to form at least a portion of the first slurry.

While these embodiments have been described with emphasis on the embodiments, it should be understood that within the scope of the appended claims, the embodiments might be practiced other than as specifically described herein.

What is claimed is:

1. An apparatus for removing hydrocarbons and contaminates comprising:
  a. a first trailer;
  b. a hopper for receiving input material;
  c. a material moving device disposed in the hopper for ensuring continuous flow of the input material through the hopper;
  d. a controller for controlling a speed of the material moving device;
  e. a plurality of injection ports adjacent the material moving device for introducing a first fluid to the input material to form a first slurry;
  f. a separation tank for: receiving the first slurry, agitating the first slurry, and allowing particulate to settle to form a separated contaminate and a particulate effluent, wherein the separation tank comprises:
    (i) a first portion for receiving the first slurry;
    (ii) a separation tank pump in the first portion;
    (iii) an agitator port in fluid communication with the separation tank pump;
    (iv) a second portion in fluid communication with the first portion; and
    (v) an extractor disposed in the first portion;
  g. at least one scalper screen for receiving the particulate effluent and for separating the particulate effluent into a first hydrocarbon extracted particulate with a diameter greater than one thousand microns, thereby forming a second slurry;
  h. at least one scalper tank, wherein each scalper tank comprises a scalper agitator to form a suspension from the second slurry;
  i. at least one de-silting hydrocyclone for receiving the suspension and for removing a second hydrocarbon extracted particulate with a diameter greater seventy five microns to form a third slurry;
  j. a desilting screen for receiving the second hydrocarbon extracted particulate;
  k. a desilting tank containing a desilting agitator for receiving the third slurry and for forming an agitated third slurry;
  l. a clay extractor for: receiving the agitated third slurry, removing a third hydrocarbon extracted particulate with a diameter greater than ten microns, and forming a fourth slurry;
  m. a clay screen for receiving the third hydrocarbon extracted particulate;
  n. a clay slurry tank with a clay agitator for receiving the fourth slurry; and
  o. a heating device disposed within the clay slurry tank and in fluid communication with the desilting tank, the at least one scalper tank, and the first portion.

2. The apparatus for removing hydrocarbons and contaminates of claim 1, further comprising a dewatering centrifuge for receiving the fourth slurry and applying a centrifugal force for separation of particulate and liquid.

3. The apparatus for removing hydrocarbons and contaminates of claim 1, wherein walls of the clay slurry tank extend higher than the desilting tank but allow fluid from the clay slurry tank to flow into the desilting tank when the fluid in the clay slurry tank exceeds a preset limit.

4. The apparatus for removing hydrocarbons and contaminates of claim 1, wherein walls of the desilting tank extend higher than the at least one scalper tank and allow fluid in the desilting tank to flow into the at least one scalper tank when fluid in the desilting tank exceeds a preset limit.

* * * * *